US008462972B2

(12) United States Patent
Hastrup

(10) Patent No.: US 8,462,972 B2
(45) Date of Patent: Jun. 11, 2013

(54) LISTENING DEVICE WITH A RECHARGEABLE ENERGY SOURCE ADAPTED FOR BEING CHARGED THROUGH AN ITE-UNIT, OR A CONNECTOR CONNECTABLE TO, OR A CONNECTOR OF, A BTE-UNIT

(75) Inventor: Simon Hastrup, Smørum (DK)

(73) Assignee: Oticon A/S, Smorum (DK)

( * ) Notice: Subject to any disclaimer, the term of this patent is extended or adjusted under 35 U.S.C. 154(b) by 274 days.

(21) Appl. No.: 12/858,253

(22) Filed: Aug. 17, 2010

(65) Prior Publication Data

US 2011/0069854 A1 Mar. 24, 2011

Related U.S. Application Data

(60) Provisional application No. 61/244,101, filed on Sep. 21, 2009, provisional application No. 61/346,045, filed on May 19, 2010.

(30) Foreign Application Priority Data

Sep. 21, 2009 (EP) .................................. 09170863
May 19, 2010 (EP) .................................. 10163211

(51) Int. Cl.
*H04R 25/00* (2006.01)
(52) U.S. Cl.
USPC ............................. 381/323; 381/322; 381/324
(58) Field of Classification Search
USPC ........................................................ 381/323
See application file for complete search history.

(56) References Cited

U.S. PATENT DOCUMENTS

| 5,253,300 | A * | 10/1993 | Knapp ........................... 381/323 |
| 6,600,825 | B1 * | 7/2003 | Leysieffer ..................... 381/328 |
| 7,735,996 | B2 * | 6/2010 | van der Zwan et al. ...... 351/158 |
| 8,107,654 | B2 * | 1/2012 | Edwards et al. .............. 381/312 |
| 2004/0073275 | A1 | 4/2004 | Maltan et al. |
| 2004/0264720 | A1 | 12/2004 | Huang et al. |
| 2007/0172091 | A1 | 7/2007 | Tsai et al. |
| 2008/0118093 | A1 | 5/2008 | Klemenz et al. |

(Continued)

FOREIGN PATENT DOCUMENTS

| EP | 1 727 395 A2 | 11/2006 |
| EP | 1 921 893 A2 | 5/2008 |

(Continued)

OTHER PUBLICATIONS

European Search Report dated Mar. 11, 2010.

*Primary Examiner* — Christopher Uhlir
(74) *Attorney, Agent, or Firm* — Buchanan Ingersoll & Rooney

(57) ABSTRACT

A listening device comprising an ITE part adapted for being located in an ear canal of a user and a BTE part adapted for being located behind an ear of the user, the ITE and BTE parts being at least mechanically connected by a connecting element, the listening device having a rechargeable energy source and electric charge terminals for allowing the charging of the rechargeable energy source when electrically connected to charging terminals of a charging station. Further, a method of charging a rechargeable energy source of a listening device and to a listening system. The electric charging terminals of the listening device are located in or on the ITE part, the connecting element or in an electrical connector of the connecting element connectable to the BTE part, or in an electrical connector of the BTE part connectable to the electrical connector of the connecting element.

15 Claims, 4 Drawing Sheets

U.S. PATENT DOCUMENTS

| | | |
|---|---|---|
| 2008/0136369 A1 | 6/2008 | Klemenz et al. |
| 2008/0137890 A1 | 6/2008 | Petersen et al. |
| 2008/0232623 A1 | 9/2008 | Solum et al. |
| 2009/0067652 A1 | 3/2009 | Schmidt et al. |
| 2009/0134306 A1 | 5/2009 | Koo |
| 2009/0262964 A1 * | 10/2009 | Havenith et al. ............. 381/314 |

FOREIGN PATENT DOCUMENTS

| | | |
|---|---|---|
| EP | 2 034 768 A2 | 3/2009 |
| EP | 2 063 669 A2 | 5/2009 |
| WO | WO 2006/077192 A1 | 7/2006 |
| WO | WO 2007/101439 A2 | 9/2007 |

* cited by examiner

LISTENING DEVICE WITH A RECHARGEABLE ENERGY SOURCE ADAPTED FOR BEING CHARGED THROUGH AN ITE-UNIT, OR A CONNECTOR CONNECTABLE TO, OR A CONNECTOR OF, A BTE-UNIT

TECHNICAL FIELD

The present invention relates to portable electronic listening devices comprising an electrically rechargeable energy source. The invention relates specifically to a listening device comprising a rechargeable energy source, the listening device comprising an ITE part adapted for being located in an ear canal of a user and a BTE part adapted for being located behind an ear of the user.

The invention furthermore relates to a method of charging a rechargeable energy source of a listening device. The invention furthermore relates to a listening system comprising a listening device and a charging station.

The invention may be useful in a listening device using a rechargeable energy source, e.g. a rechargeable battery.

BACKGROUND ART

Rechargeable energy sources (e.g. batteries) find increasing use in listening devices. Wired (cf. e.g. WO 2007/101439 A2) or wireless (cf. e.g. EP 1 727 395 A2) recharging of rechargeable batteries are alternatively used by charging stations. EP 2 034 768 A2 deals with a hearing aid of the completely in the ear type having a retractable contact unit for contacting an external unit, e.g. for establishing contact to a battery charging unit. The present application deals with recharging based on a galvanic connection between charging station and rechargeable energy source.

Charging pads are e.g. placed on the main body of a listening device, cf. behind the ear (BTE) hearing aid example of FIG. 1, where a receiver (speaker) of the listening device is located in the ear canal (RITE) and the two parts are mechanically and electrically connected by a connecting tubular element.

The invention deals with various ways of placing the charging pads or contact terminals in or on a portable listening device.

DISCLOSURE OF INVENTION

The idea is to move the charging pads away from the main body (e.g. a BTE part adapted to be located at or behind an ear of a user) of the listening device (e.g. a hearing aid) to the "accessories" (e.g. an ITE part adapted for being located in an ear canal of a user, or a connecting element for connecting a BTE part with an ITE part) or to an existing connector of the main body and thereby preferably reuse existing connections. This gives—in an embodiment—the opportunity to have a completely sealed listening device (main body, e.g. BTE part).

The charging pads can have wires of their own in an ITE part comprising a receiver or they can be connected to existing wires, for example the receiver wires (e.g. using appropriate switch elements). If the receiver wires are also used for charging, then a filtration of the signals can be placed either in a BTE-part of the listening device or in an ITE part comprising the receiver.

This invention can be applied to all types of ITE parts, irrespective whether the ITE part only consists of a receiver or it also comprises other components, e.g. a microphone and/or a rechargeable energy source (battery).

An embodiment of the concept comprises the charging of the battery through the same connector used to connect the ITE part to the parts of the listening device located in a main body of the listening device, e.g. in a BTE part (the connector in a normal operational mode of the listening device connecting components of the ITE part (e.g. a receiver, a microphone, etc.) to components located in the BTE part, e.g. an output driver, a signal processing unit, etc.). In practice, the connector of the listening device used for charging the rechargeable energy source may be located in the main body part or in an accessory part of the listening device.

An object of the present invention is to provide an alternative scheme for charging a rechargeable energy source of a listening device.

Objects of the invention are achieved by the invention described in the accompanying claims and as described in the following.

A Listening Device:

An object of the invention is achieved by a listening device comprising an ITE part adapted for being located in an ear canal of a user and a BTE part adapted for being located behind an ear of the user, the ITE and BTE parts being at least mechanically connected by a connecting element, the listening device comprising a rechargeable energy source and electric charge terminals for allowing the charging of the rechargeable energy source when electrically connected to charging terminals of a charging station, wherein the electric charging terminals of the listening device are located in or on the ITE part, the connecting element or in an electrical connector of the connecting element connectable to the BTE part or in an electrical connector of the BTE part connectable to the electrical connector of the connecting element.

The charging terminals may thus preferably be located in a connector for connecting the BTE and ITE parts. This has the advantage that the same connector can be used to connect the BTE and ITE parts during normal operation and for connecting the BTE or ITE parts (depending on which one of the parts comprises the rechargeable energy source) to a charging station during recharging of the rechargeable energy source. In an embodiment, the listening device comprises an electrical connection between the ITE and BTE parts during normal operation.

In a particular embodiment, the listening device is adapted to provide that electrical contact between the electric charge terminals of the listening device and the charging terminals of the charging station is established via a cable with an electrical connector matching an electrical connector of the BTE part.

In a particular embodiment, the rechargeable energy source comprises a rechargeable battery.

In a particular embodiment, the rechargeable battery is located in the ITE part or in the connecting element.

In a particular embodiment, the ITE part comprises a receiver.

The ITE part comprises a housing for enclosing the functional components of the ITE part, e.g. a receiver and/or a microphone and appropriate electrical connections. In a particular embodiment, the electric charge terminals are located on the housing of the ITE part.

In a particular embodiment, the BTE part comprises a hermetically closed outer housing.

In a particular embodiment, the ITE part comprises a microphone. In an embodiment the microphone is located in the ITE part to ensure that it faces away from the ear drum (and towards the outer environment) when the ITE part is mounted in an ear canal of the user.

In a particular embodiment, the BTE part comprises a signal processing unit. Typically, the signal processing unit is or can be adapted to provide a frequency dependent gain according to a user's needs. In an embodiment, the BTE part comprises a driver (e.g. including a DA- or DD-converter) for driving the receiver.

In a particular embodiment, the BTE part, the ITE part or the connecting element comprises circuitry for managing the charging of the rechargeable energy source.

In a particular embodiment, the connecting element (and/or the electrical connectors of the connecting element or the BTE part) comprises seven or less electrical conductors for establishing electrical connections between the BTE part and the ITE part, e.g. less than 6 or less than 5 or less than 4 connections. In an embodiment, the BTE part and/or the ITE part comprises circuitry adapted to allow a use of one or more of the electrical conductors for several purposes depending on the mode of operation, e.g. 1) to connect a charging station to the rechargeable energy source during a charging mode and 2) to connect a receiver or microphone of the ITE part to the BTE part (e.g. to a signal processing unit located in the BTE part) during a normal mode of operation of the listening device.

In a particular embodiment, the electrical connector of the connecting element or of the BTE part, which is used for charging the rechargeable energy source in a charging station, is adapted to be used for electrically connecting the ITE part to the BTE part during normal operation of the listening device. In an embodiment, the connecting element comprises electrical conductors, which in a normal mode of operation of the listening device, are adapted for appropriately connecting functional elements of the ITE part (e.g. a battery, a receiver, a microphone, etc.) with functional elements of the BTE part (e.g. a signal processing unit, an AD-, a DA-conversion unit, a microphone, a battery, etc.).

In a particular embodiment, the listening device comprises a hearing instrument, a headset, a headphone, an active ear protection device or a combination thereof.

Use:

In an aspect use of a listening device as described above, in the detailed description of 'mode(s) for carrying out the invention' and in the claims is furthermore provided.

A Method:

A method of charging a rechargeable energy source of a listening device comprising an ITE part adapted for being located in an ear canal of a user and a BTE part adapted for being located behind an ear of the user, the ITE and BTE parts being at least mechanically connected by a connecting element, the listening device comprising a rechargeable energy source and electric charge terminals for allowing the charging of the rechargeable energy source when electrically connected to charging terminals of a charging station is furthermore provided by the present invention. The method comprises charging the energy source via the electric charging terminals located in or on the ITE part, the connecting element, or in an electrical connector of the connecting element connectable to the BTE part, or in an electrical connector of the BTE part connectable to the electrical connector of the connecting element.

In an embodiment, the method comprises a charging mode, wherein the rechargeable energy source is recharged.

It is intended that the structural features of the device described above, in the detailed description of 'mode(s) for carrying out the invention' and in the claims can be combined with the method, when appropriately substituted by a corresponding process or vice versa. Embodiments of the method have the same advantages as the corresponding device.

In an embodiment, the connecting element is adapted to be a rechargeable (e.g. disposable) part that is regularly exchanged with a corresponding (e.g. new) part. In an embodiment, the ITE part is adapted to be a rechargeable (e.g. disposable) part that is regularly exchanged with a corresponding (e.g. new) part. In a particular embodiment, the connecting element and the ITE part are adapted to be a combined, rechargeable (e.g. disposable) part that is regularly exchanged with a corresponding (e.g. new) part. In a particular embodiment, where the rechargeable energy source (e.g. a battery) is located in the ITE part or in the connecting element, the combined, rechargeable part is exchanged with a corresponding part when the rechargeable energy source is to be recharged. In an embodiment, the combined, rechargeable part comprises a receiver and a microphone of the listening device. In an embodiment, the rechargeable part is exchanged with a corresponding part (which is ready for use), wherein the rechargeable energy source is partially or fully charged.

A Listening System:

A listening system is moreover provided by the present invention. The listening system comprises (at least an ITE part and a connecting element of) a listening device as described above, in the detailed description of 'mode(s) for carrying out the invention' and in the claims and a charging station (for charging or recharging the rechargeable energy source of the listening device), wherein the connecting element and the BTE part comprise corresponding connectors adapted to electrically connect the ITE part to the BTE part during normal operation of the listening device and where the charging station is adapted to use (one of) the connectors for electrically charging the energy source of the listening device. The listening device is thus adapted to provide that electrical contact between electric charge terminals of the listening device and charging terminals of the charging station is established via a cable with an electrical connector matching an electrical connector of the connecting element or of the BTE part. In other words, the charging station comprises an electrical connector that corresponds to the electrical connector of either of the BTE part or the connecting element for connecting the BTE and ITE parts during normal operation, depending on where the local energy source is located.

It is intended that the structural features of the device described above, in the detailed description of 'mode(s) for carrying out the invention' and in the claims can be combined with the system, when appropriate or vice versa. Embodiments of the system have the same advantages as the corresponding device.

In an embodiment, where the rechargeable energy source is located in the ITE part or in the connecting element connecting the ITE and BTE parts, an electrical connector of the BTE part and the charging station are of the same (male or female) type, e.g. of the socket type, and an electrical connector of the connecting element for connection the BTE and ITE parts is of the corresponding opposite (female or male) type, e.g. of the plug type matching the corresponding sockets of the BTE part and the charging station. Alternatively, the use of plug- and socket-type connectors can be the reverse.

In an embodiment, where the rechargeable energy source is located in the BTE part, the electrical connector of the connecting element for connection the BTE and ITE parts and the charging station are of the same (male or female) type, e.g. of the plug type, and an electrical connector of the BTE part is of the corresponding opposite (female or male) type, e.g. of the socket type matching the corresponding plugs of the electrical connector of the connecting element and the charging station. Alternatively, the use of plug- and socket-type connectors can be the reverse.

The electric charge terminals used during charging and the electric terminals used during normal operation in the listening device may (or may not) be fully or partially shared, in which case appropriate switching circuitry can be implemented on shared terminals.

In a particular embodiment, the charging station comprises circuitry for managing the charging of the rechargeable energy source.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
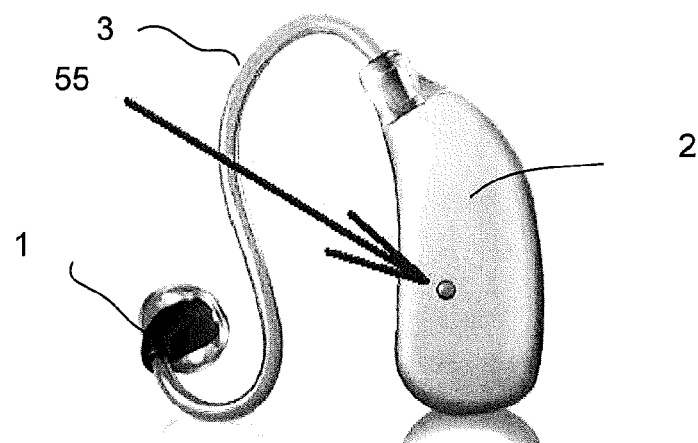
FIG. 1 shows a receiver in the ear-type hearing instrument comprising charging terminals located on a BTE-part of the instrument.

FIG. 1 shows a receiver in the ear-type hearing instrument comprising charging terminals located on a BTE-part of the instrument. The hearing instrument comprises a BTE-part 2, an ITE part 1 and a connecting element 3. The housing of the BTE part comprises charging contacts 55 on each side of the housing for recharging the rechargeable battery in a charging station by making a galvanic contact to corresponding terminals of the charging station. The BTE part comprises battery, microphone unit, signal processing unit and possible other functional units of a hearing instrument. The ITE part 1 comprises (in this example a receiver located in an ear-canal-locating flexible element to ensure an appropriate position of the receiver when mounted in the ear canal of a user. The semi-flexible connecting element 3 comprises electrical conductors for connecting the receiver to the circuitry of the BTE part (e.g. the signal processing unit). The length and rigidity of the connecting element is adapted to allow a certain adaptation of its form to the anatomy of the user, so that the ITE and BTE parts can be appropriately located in the ear canal and at the ear of the user, respectively, and so that its form is maintained during normal handling of the hearing instrument (e.g. to allow mounting and taking off of the instrument).

EXAMPLE 1

Figure 2:
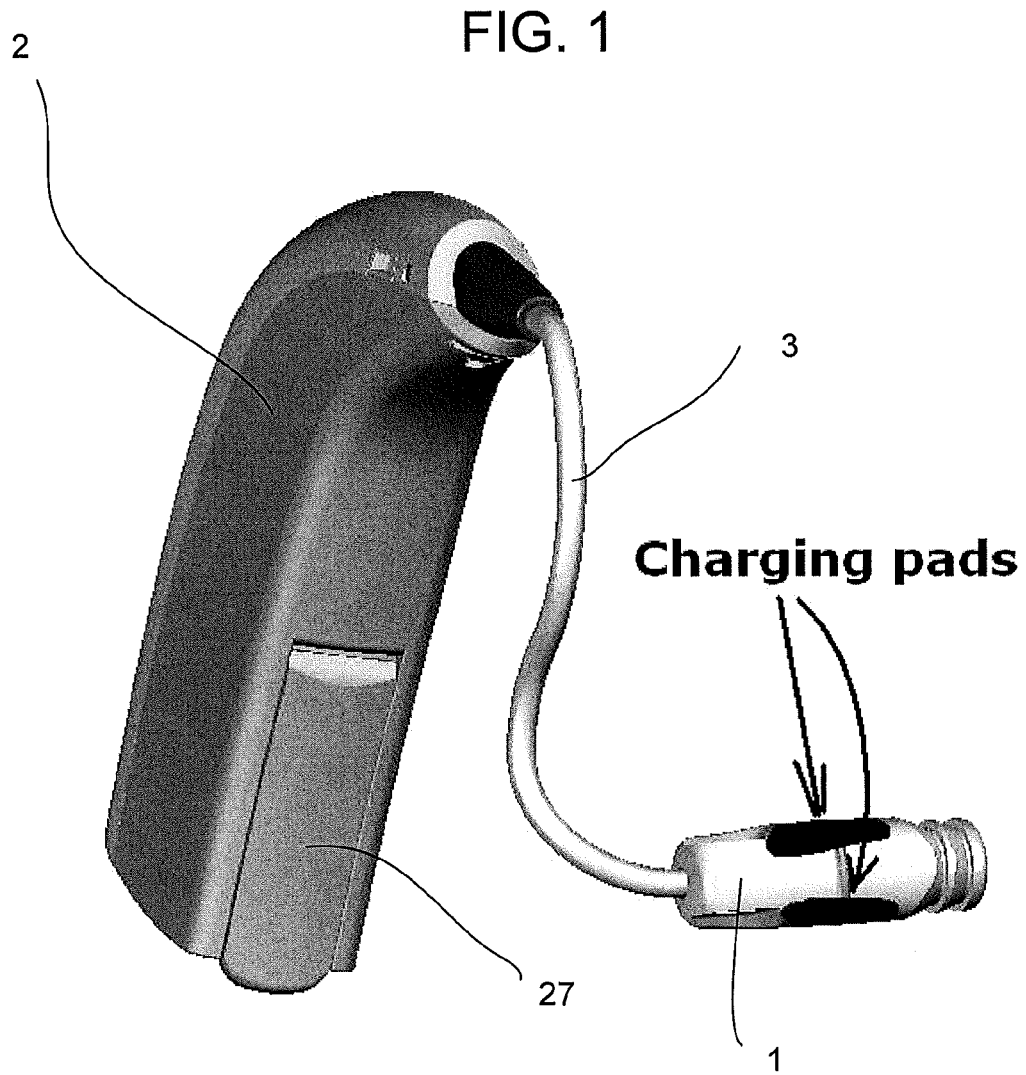
FIG. 2 shows a receiver in the ear-type hearing instrument comprising charging terminals located on an ITE-part of the instrument.

FIG. 2 shows a receiver in the ear-type hearing instrument comprising charging terminals (Charging pads in FIG. 2) located on an ITE-part 1 of the instrument. The ITE part 1 comprises a receiver for presenting a processed signal to a user, when the ITE part is located in an ear canal of the user. The rechargeable energy source, here a rechargeable battery, is placed in the BTE part 2 of the hearing instrument, cf. battery drawer 27. In this embodiment, the charging current during recharge in a charging station is picked up by the Charging pads of the ITE-part and fed through appropriate electrical conductors in the connecting element 3 to the rechargeable battery in the BTE part 2. In addition to the battery, the BTE-part 2 of the hearing instrument comprises a microphone system (e.g. a directional microphone system) for picking up sounds from the environment and converting them to corresponding electrical input signals and a signal processing unit for enhancing the electrical input signals, typically including to apply a frequency dependent gain to the signal in accordance with a user's needs. The BTE part may further comprise other functionality of a state of the art hearing instrument (e.g. a telecoil and/or other wired or wireless receiver and corresponding circuitry).

EXAMPLE 2

Figure 3A:
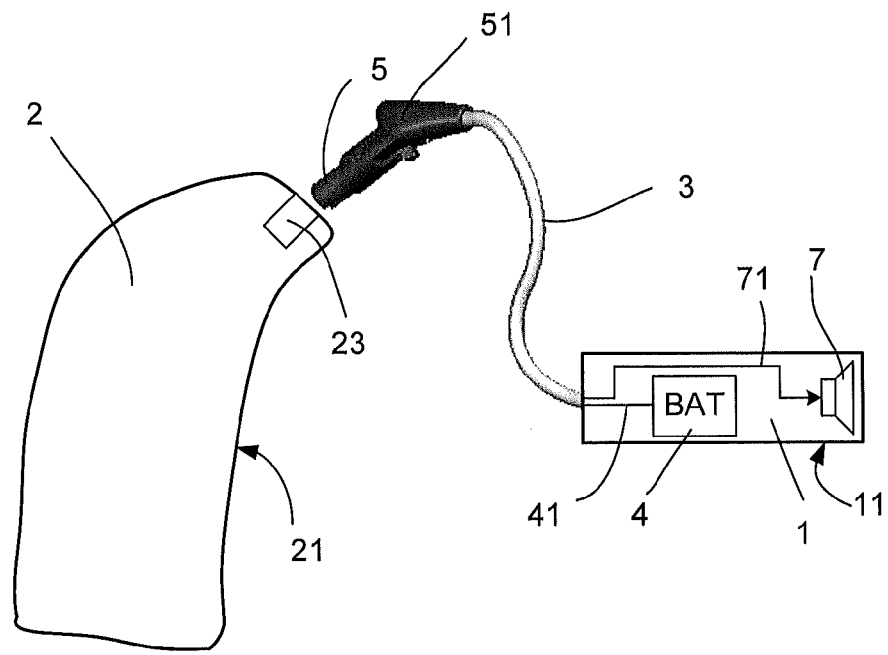
FIG. 3 shows an embodiment of a listening device (FIG. 3a) and an embodiment of a part of a listening system (FIG. 3b)
Figure 3B:
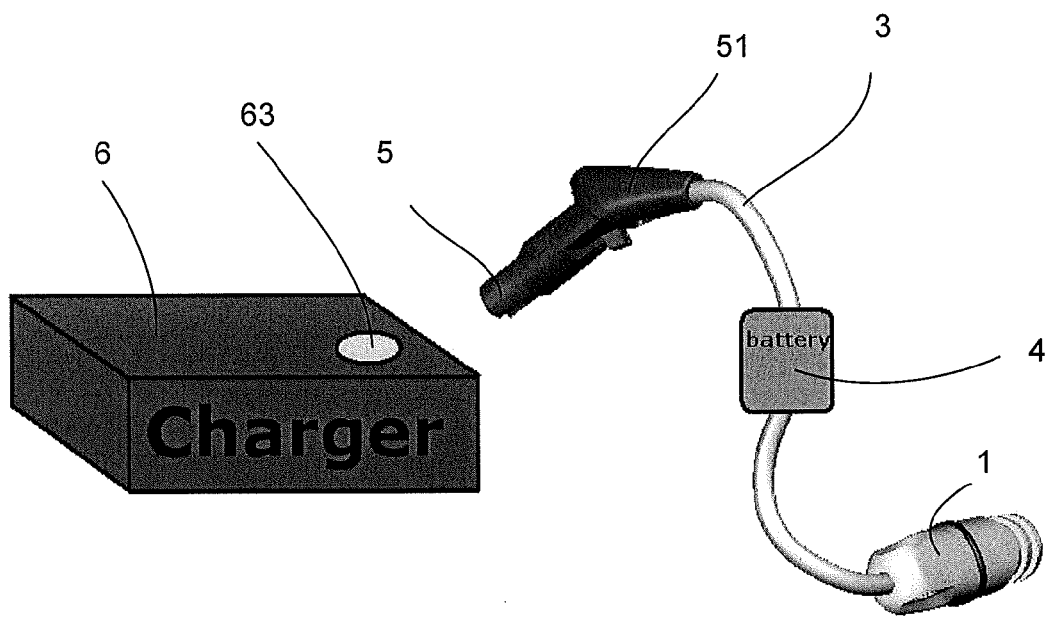

FIG. 3 shows an embodiment of a listening device (FIG. 3a) and an embodiment of a listening system (FIG. 3b). In this example the listening system, e.g. a hearing instrument, in which the battery is placed, is adapted to be charged through a connector 5, 51 of the connecting element 3. In the listening device of FIG. 3a, the ITE part 1 comprises a rechargeable battery (BAT in FIG. 3a) and a receiver 7 enclosed in ITE housing 11. The BTE part comprises other functionality of the hearing instrument, including signal processing and microphone units. The housing 21 of the BTE part comprises connector 23 adapted to receive and electrically connect connector 5 of the connecting element. The connector 5 of the connecting element 3 comprises an electrically insulating element 51 adapted for facilitating placement or removal of the connecting element in/from the corresponding sockets 23, 63 of the BTE part 2 and the charging station 6, respectively. The BTE part 2, the socket 23, the plug 5, the connecting element 3 and the ITE part 1 comprise electrical conductors (cf. 41, 71 in the ITE part, each possibly comprising a number of separate electrical conductors to establish the connection) for 1) electrically connecting the battery (BAT) and the receiver 7 to the relevant functional units of the BTE part 2, when the connector (plug) 5 of the connecting element 3 is placed in the appropriate connector (socket) 23 of the BTE part, in a normal operating mode (FIG. 3a), and for
2) electrically connecting the battery (BAT) to a charging source in a charging station 6, when the connector (plug) 5 of the connecting element 3 is placed in the appropriate connector (socket) 63 of a charging station 6, in a charging mode (FIG. 3b).

FIG. 3b illustrates a charging mode of a hearing aid system comprising charger 6 and a connecting element 3 and ITE part 1 of a listening device. In the embodiment of FIG. 3b, the rechargeable battery 4 is located in the connecting element 3 (instead of in the ITE part 1 as in FIG. 3a), but the function and external form and number of conductors/pins of the connector 5, 51 may be identical to those of the embodiment of FIG. 3a.

The charger-cable (connecting element 3) is connected to the ITE part and thereby reusing the connecting element to recharge the battery.

EXAMPLE 3

Figure 4A:
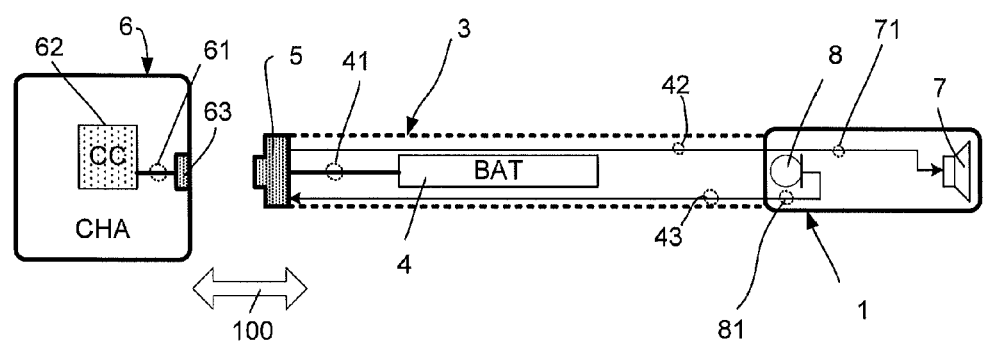
FIG. 4 shows an embodiment of a part of a listening system (FIG. 4a) and an embodiment of a listening device (FIG. 4b)
Figure 4B:
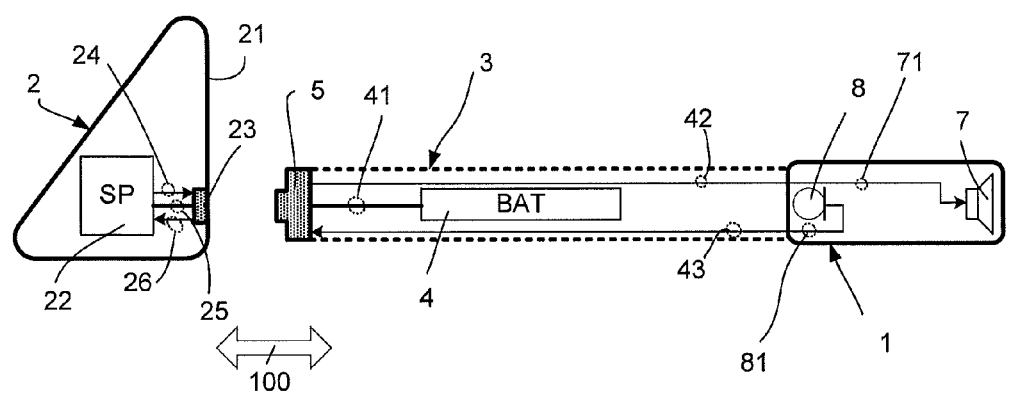

FIG. 4 shows an embodiment of a listening system (FIG. 4a) and an embodiment of a listening device (FIG. 4b). In this example the ITE part 1 comprises receiver 7 as well as microphone 8, whereas the rechargeable battery 4 (BAT) is integrated with the connecting element 3. It may alternatively form part of the ITE part (as suggested in the embodiment of FIG. 3a).

FIG. 4a shows an embodiment of a listening system comprising a charger 6, a connecting element 3 and an ITE part 1 of a listening device. The arrow 100 illustrates the possible connection and disconnection of connectors 63 and 5 of the charging station 6 and the connecting element 3, respectively. The charging station 6 (CHA in FIG. 4a) comprises charging source and circuitry 62 (CC in FIG. 4a), which may be specifically adapted for charging a particular type of rechargeable energy source. When the connectors 63 and 5 of the charging station 6 and the connecting element 3 are joined (electrically connected), a charging process may be initiated in the charging station that recharges the battery via electrical connections 61 and 41 through connectors 63, 5. The electrical connections 61, 41 may comprise more than one electrical conductor, typically 2 electrical conductors each. Typically, no electrical connection to the electrical components of the connecting element 3 and the ITE part 1 (here microphone 8 and receiver 7) other than to the battery (BAT) is established during charging of the rechargeable battery (in the charging mode of the listening system).

FIG. 4b shows an embodiment of a listening device comprising a BTE part 2, a connecting element 3 and an ITE part 1. The arrow 100 illustrates the possible connection and disconnection of connectors 23 and 5 of the BTE part and connecting element 3, respectively. When the connectors 23 and 5 of the BTE part 2 and the connecting element 3 are joined (electrically connected), electrical connections between the signal processing unit 22 (SP) of the BTE part 2 and the battery 4 (BAT), the receiver 7 and the microphone 8 of the connecting element 3 and the ITE part 1 are established through connectors 23, 5. The battery 4 provides energy to the electrical units of the hearing instrument, here the BTE part (including the signal processing unit 22) and the ITE part (including the microphone 8). The electrical connections 25, 41 between battery and BTE part may comprise more than one electrical conductor, typically 2 electrical conductors each. Similarly, the electrical connections 24, 42, 71 between the BTE part and the receiver of the ITE part may comprise more than one electrical conductor, typically 2 electrical conductors each. Similarly, the electrical connections 81, 43, 26 between the microphone of the ITE part and the BTE part may comprise more than one electrical conductor, typically 3 electrical conductors each.

In a preferred embodiment, the BTE part 2 comprises a hermetically closed housing 21 to protect the electronic circuitry of the BTE part from the aggressive environment of a human ear canal (salty, humid). This is feasible, because the microphone and receiver are located outside the BTE part (the BTE part comprising only signal processing (SP) and possible other functionality (e.g. wireless communication circuitry), which does not require openings in the housing). This has the further advantage that the customized parts of the hearing instrument is concentrated to the BTE part, whereas the rest (here connecting element 3 and ITE part 1) comprises standard components that may be exchanged during the lifetime of the hearing instrument, either regularly or when needed (e.g. when the rechargeable energy source has degraded to an unacceptable level, e.g. due to too many recharging cycles).

A hermetically closed BTE part enclosing a number of electronic parts (e.g. mounted on a substrate. e.g. a flexible printed circuit board) can be made in a number of different ways. In an embodiment, the housing of the BTE part moulded around the components, e.g. directly around (so that the mould may be allowed to touch the enclosed components) or around an intermediate shell or skeleton (e.g. protecting selected components) used as a carrier for the mould. In an embodiment, two or more shell parts are glued or welded together. In an embodiment, two or more shell parts are joined together by micro-snap elements that irreversibly and hermetically join the parts (e.g. by inserting an intermediate sealing element, e.g. a gasket, between the shell parts). In an embodiment, the hermetically closed BTE part is adapted to be able to withstand commonly occurring pressure differences (e.g. up to 2 or 3 atm. difference). Alternatively or additionally, the housing of the BTE part is provided with a pressure equalization valve adapted for allow a pressure equalization, if the pressure difference between the interior and exterior of the housing exceeds a predefined threshold level, e.g. 1 atm., or exceeds a predefined factor, e.g. a factor of 2 or 3.

The connecting element 3 and the ITE part 1 shown in FIG. 4a are adapted to be used with the BTE part 2 of FIG. 4b thereby constituting the listening device of FIG. 4b.

An elongate, rechargeable battery may in general be implemented in a number of ways. One possible solution providing a wire- or cable-like battery is discussed in WO 2006/077192 A1. A rechargeable battery for use in a listening device may e.g. be of the NiMH-type or of the Li-Ion-type.

EXAMPLE 4

Figure 5A:
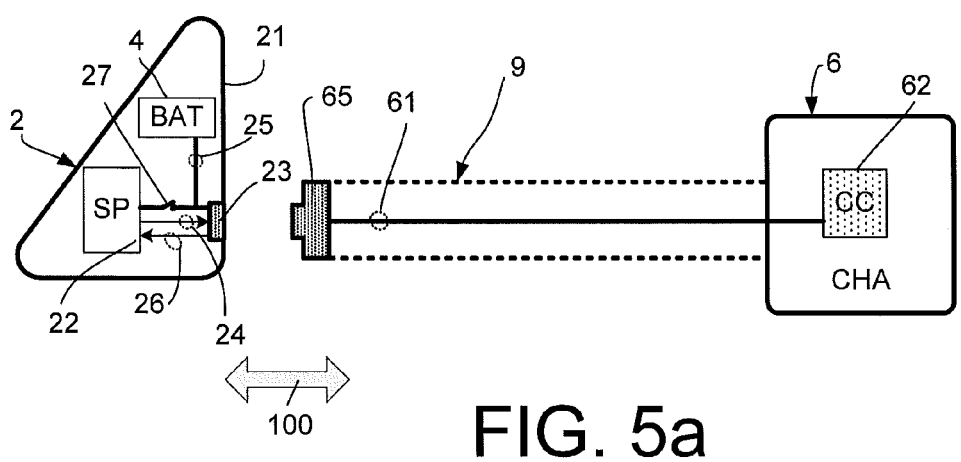
FIG. 5 shows an embodiment of a part of a listening system (FIG. 5a) and an embodiment of a listening device (FIG. 5b).
Figure 5B:
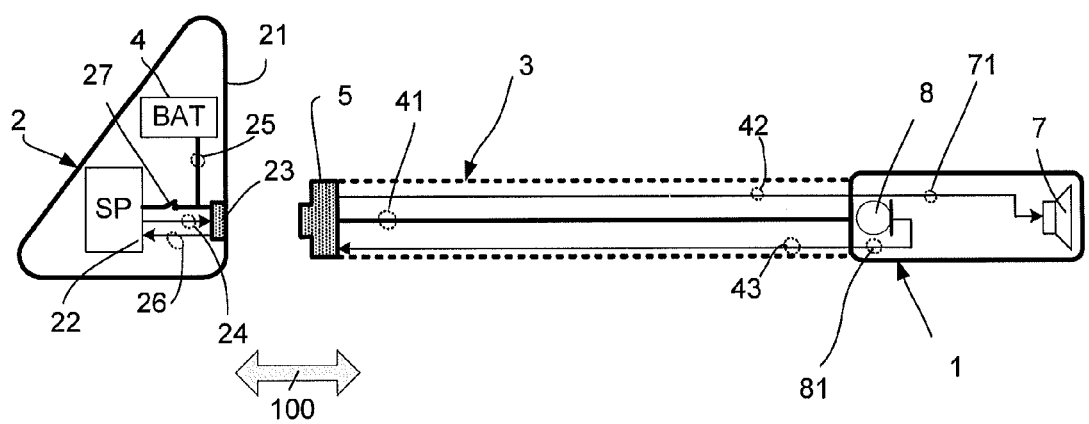

FIG. 5 shows an embodiment of a listening system, FIG. 5a illustrating on part of the system and FIG. 5b illustrating another part of the system in the form an embodiment of a listening device. In this example, the charging terminals of the listening device are located in a connector 23 of the BTE part 2 connectable to the electrical connector 5 of the connecting element 3 and to the electrical connector 65 of charging station 6.

FIG. 5a shows an embodiment of a part of a listening system comprising a charging station 6, a charging cable 9 with a connector 65 and a BTE part 2 of a listening device with a connector 23 corresponding to connector 65 of the charging cable and allowing to establish an electrical connection between the charging station 6 and a battery 4 of the BTE part 2. The arrow 100 illustrates the possible connection and disconnection of connectors 23 and 65 of the BTE part 2 and the charging station 6, respectively. The charging station 6 (CHA in FIG. 5a) comprises charging source and circuitry 62 (CC in FIG. 5a), which may be specifically adapted for charging a particular type of rechargeable energy source (e.g. a NiMH or Li-Ion type battery). When the connectors 23 and 65 of the BTE part 2 and the charging station 6, respectively, are joined (electrically connected), a charging process may be initiated in the charging station that recharges the battery via electrical connections 61 and 25 through connectors 23, 65. The electrical connections 61, 25 may comprise more than one electrical conductor, typically 2 electrical conductors each. Typically, no electrical connection to the electrical components of the BTE part 2 (here signal processing unit (SP) 22) other than to the battery (BAT) is established during charging of the rechargeable battery (in the charging mode of the listening system). This is schematically indicated in FIG. 5a by switch 27, which in charging mode is open. The control of the switch may be governed by the charging station 6 (e.g. via a electric control connection to the BTE part via the cable 9 and connector 65) or the BTE part 2 (e.g. the signal processing unit 22) or alternatively by a user operable activation element on the BTE part.

FIG. 5b shows an embodiment of a listening device comprising a BTE part 2, a connecting element 3 and an ITE part 1. The arrow 100 illustrates the possible connection and disconnection of connectors 23 and 5 of the BTE part and connecting element 3, respectively. When the connectors 23 and 5 of the BTE part 2 and the connecting element 3 are joined (electrically connected), electrical connections between the signal processing unit 22 (SP) of the BTE part 2 and the battery 4 (BAT), the receiver 7 and the microphone 8 of the connecting element 3 and the ITE part 1 are established through connectors 23, 5. In this, normal, mode switch 27 is closed allowing the battery 4 to power feed signal processing unit 22. The battery 4 provides energy to the electrical units of the listening device, here the BTE part (including the signal processing unit 22) and the ITE part (including the microphone 8). The electrical connections 25, 41 between the battery and the electronic components that it energizes may comprise more than one electrical conductor, typically 2 electrical conductors each. Similarly, the electrical connections 24, 42, 71 between the BTE part and the receiver of the ITE part may comprise more than one electrical conductor, typically 2 electrical conductors each. Similarly, the electrical connections 81, 43, 26 between the microphone of the ITE part and the BTE part may comprise more than one electrical conductor, typically 3 electrical conductors each.

In an embodiment, the BTE part, the connecting element and/or the ITE part comprises electronic elements adapted for—in a charging mode—allowing the use of at least one, e.g. two or more, of the electrical conductors of the connecting element (and possibly corresponding contact element(s) of the electrical connector of the connecting element or of the BTE part), which—in a normal mode of operation of the listening device—is used for connecting functional elements of the ITE and BTE parts, respectively, for the charging of the rechargeable battery.

The connection between the BTE and ITE parts of the embodiments of FIG. 2-5 can e.g. be made by standard n-pin connectors, e.g. of the plug and socket type, e.g. standard 3, 4 and 5 pin connectors CS43, CS44 and CS45 (plugs and sockets according to IEC-118-12 are e.g. available from Sonion/Pulse Engineering Inc., e.g. Roskilde, Denmark).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

References

WO 2006/077192 A1 (OTICON) Jul. 27, 2006
WO 2007/101439 A2 (GN RESOUND) Sep. 13, 2007
EP 1 727 395 A2 (AUDIA AKUSTIK) Nov. 29, 2006
EP 2 034 768 A2 (SIEMENS MEDICAL INSTRUMENTS) Mar. 11, 2009

The invention claimed is:

1. A listening device comprising an ITE part adapted for being located in an ear canal of a user and a BTE part adapted for being located behind an ear of the user, the ITE and BTE parts being at least mechanically connected by a connecting element, the listening device comprising a rechargeable energy source and electric charge terminals for allowing charging of the rechargeable energy source when electrically connected to charging terminals of a charging station,
wherein the connecting element comprises a cable and an electrical connector,
wherein the electric charge terminals of the listening device are located in the electrical connector of the connecting element connectable to the BTE part,
wherein the rechargeable energy source is located in the connecting element,
wherein electrical contact between the listening device and the charging station is established via the cable with the electrical connector,
wherein the length and rigidity of the connecting element is adapted to allow a certain adaptation of its form to the anatomy of the user, so that the ITE and BTE parts can be appropriately located in the ear canal and at the ear of the user, respectively.

2. A listening device according to claim 1 wherein the ITE part comprises a receiver.

3. A listening device according to claim 1 wherein the electrical connector of the connecting element used for charging the rechargeable energy source in a charging station is adapted to be used for electrically connecting the connecting element to the BTE part during normal operation.

4. A listening device according to claim 1 wherein the BTE part comprises a hermetically closed outer housing.

5. A listening device according to claim 1 wherein the ITE part comprises a microphone.

6. A listening device according to claim 1 wherein the BTE part comprises a signal processing unit.

7. A listening device according to claim 1 wherein the ITE part or the connecting element comprises circuitry for managing the charging of the rechargeable energy source.

8. A listening device according to claim 1 wherein the electrical connector of the connecting element used for charging the rechargeable energy source in a charging station is adapted to mechanically and electrically connect the connecting element directly to the BTE part.

9. A method of charging a rechargeable energy source of a listening device comprising an ITE part adapted for being located in an ear canal of a user and a BTE part adapted for being located behind an ear of the user, the ITE and BTE parts being at least mechanically connected by a connecting element, the listening device comprising a rechargeable energy source and electric charge terminals for allowing charging of the rechargeable energy source when electrically connected to charging terminals of a charging station, the method comprising:

charging said energy source via said electric charge terminals located in an electrical connector of the connecting element connectable to the BTE part, wherein the rechargeable energy source is located in the connecting element.

10. A method according to claim 9 wherein the connecting element and/or the ITE part is adapted to be a rechargeable part for being regularly exchanged with a corresponding part.

11. A method according to claim 9 providing that the rechargeable energy source is located in the connecting element, and that the combined, rechargeable part is exchanged with a corresponding part when the rechargeable energy source is to be recharged.

12. A listening system comprising a listening device according to claim 1 and a charging station, wherein the connecting element comprises a connector adapted to electrically connect the ITE part to a corresponding connector of the BTE part during normal operation of the listening device and where the charging station is adapted to use said connectors for electrically charging the rechargeable energy source of the listening device.

13. A method according to claim 9 wherein the connecting element is adapted to be a rechargeable part for being regularly exchanged with a corresponding part.

14. A method according to claim 9 providing that the rechargeable energy source is located in the connecting element, and that the combined, rechargeable part is exchanged with a corresponding part when the rechargeable energy source is to be recharged.

15. A listening device comprising an ITE part adapted for being located in an ear canal of a user and a BTE part adapted for being located behind an ear of the user, the ITE and BTE parts being at least mechanically connected by a connecting element, the listening device comprising a rechargeable energy source and electric charge terminals for allowing charging of the rechargeable energy source when electrically connected to charging terminals of a charging station, wherein the connecting element comprises a cable and an electrical connector, wherein the electric charge terminals of the listening device are located in the electrical connector of the connecting element connectable to the BTE part, wherein the rechargeable energy source is located in the connecting element, wherein electrical contact between the listening device and the charging station is established via the cable with the electrical connector.

\* \* \* \* \*